United States Patent
Hofleitner et al.

(10) Patent No.: US 10,824,743 B2
(45) Date of Patent: *Nov. 3, 2020

(54) SYSTEM AND METHOD FOR AUTONOMOUS OR REMOTE CONTROLLED DESTRUCTION OF STORED INFORMATION OR COMPONENTS

(71) Applicant: Pahmet LLC, Washington, DC (US)

(72) Inventors: Peter Hofleitner, Annapolis, MD (US); Martin E. Tross, Annapolis, MD (US)

(73) Assignee: Pahmet LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,325

(22) Filed: Nov. 22, 2019

(65) Prior Publication Data
US 2020/0097668 A1    Mar. 26, 2020

Related U.S. Application Data

(63) Continuation of application No. 15/506,743, filed as application No. PCT/US2015/046832 on Aug. 26, 2015, now Pat. No. 10,521,598.
(Continued)

(51) Int. Cl.
*G06F 21/60* (2013.01)
*F42C 15/42* (2006.01)
(Continued)

(52) U.S. Cl.
CPC ............ *G06F 21/604* (2013.01); *F42B 3/087* (2013.01); *F42C 9/16* (2013.01); *F42C 11/00* (2013.01);
(Continued)

(58) Field of Classification Search
CPC ........ G06F 21/604; G06F 21/88; F42B 3/087; F42C 9/16; F42C 11/00; F42C 15/42; F42D 3/00
See application file for complete search history.

(56) References Cited

U.S. PATENT DOCUMENTS 3,827,362 A * 8/1974 Huggett ................. F41H 13/00
                                                                89/1.14
7,964,045 B1    6/2011 Stec et al.
(Continued)

FOREIGN PATENT DOCUMENTS

| WO | 1999058799 A1 | 11/1999 |
| WO | 02095550 A2 | 11/2002 |
| WO | 2013083941 A1 | 6/2013 |

OTHER PUBLICATIONS

Rollette, "How to Thermite Hard Drive Destruction", Hackaday.com, Sep. 16, 2008.
(Continued)

*Primary Examiner* — Hee K Song
(74) *Attorney, Agent, or Firm* — Potomac Law Group, PLLC

(57) ABSTRACT

A system and method are provided for the destruction of electronically stored information and/or components that incorporated sensitive technology or that contain sensitive information upon the occurrence of one or more predetermined events. The system and method of the present invention is particularly suited for the safeguarding of electronically stored information and/or classified technology in systems deployed in an operational environment. The system and method of the present invention be incorporated into drones, full size aircraft, any type of vehicle, mines, missiles, torpedos, bombs, phones, cameras, robots, satellites or other spacecraft, computers, hard drives, thumb drives, switches, routers, bugs, brief cases, safes, and generally any device that utilizes components on which sensitive data is stored or components that utilize technology that should only be accessed by authorized personnel.

18 Claims, 2 Drawing Sheets

Related U.S. Application Data

(60) Provisional application No. 62/041,738, filed on Aug. 26, 2014.

(51) Int. Cl.
   *G06F 21/88* (2013.01)
   *F42D 3/00* (2006.01)
   *F42C 9/16* (2006.01)
   *F42B 3/087* (2006.01)
   *F42C 11/00* (2006.01)

(52) U.S. Cl.
   CPC ............... *F42C 15/42* (2013.01); *F42D 3/00* (2013.01); *G06F 21/88* (2013.01); *G06F 2221/2143* (2013.01)

(56) References Cited

U.S. PATENT DOCUMENTS

| | | | |
|---|---|---|---|
| 8,332,661 B2 * | 12/2012 | Mostovych | G06F 21/554 |
| | | | 713/194 |
| 2003/0192997 A1 | 10/2003 | Desai et al. | |
| 2004/0134993 A1 | 7/2004 | Vacherand et al. | |
| 2007/0229285 A1 | 10/2007 | Smith | |
| 2009/0251283 A1 | 10/2009 | Ito | |
| 2010/0064371 A1 | 3/2010 | Mostovych | |
| 2010/0132047 A1 * | 5/2010 | Rodriguez | G06F 21/554 |
| | | | 726/27 |
| 2010/0146635 A1 | 6/2010 | Hinchey et al. | |
| 2011/0004938 A1 | 1/2011 | Dalzell et al. | |
| 2014/0000470 A1 * | 1/2014 | Biggs | F42C 15/40 |
| | | | 102/215 |
| 2014/0373166 A1 | 12/2014 | Little | |
| 2014/0373168 A1 * | 12/2014 | Chen | G06F 21/51 |
| | | | 726/26 |

OTHER PUBLICATIONS

Supplementary European Search Report issued in application EP 15834837 dated Mar. 2, 2018.

* cited by examiner

SYSTEM AND METHOD FOR AUTONOMOUS OR REMOTE CONTROLLED DESTRUCTION OF STORED INFORMATION OR COMPONENTS

CROSS-REFERENCE TO RELATED APPLICATIONS

This application is a continuation of U.S. patent application Ser. No. 15/506,743, filed Feb. 26, 2017, which is a U.S. national stage of International Application No. PCT/US2015/046832, filed Aug. 26, 2015, which claims priority to U.S. Provisional Application Ser. No. 62/041,738, filed Aug. 26, 2014, the entire disclosures of which are incorporated herein by reference.

FIELD OF THE INVENTION

The present invention relates to the destruction of stored information and/or components and, more particularly, to the destruction of stored information and/or components upon the occurrence of one or more predetermined events.

BACKGROUND OF THE RELATED ART

Governments have always had a need to keep intelligence gathered from spy operations, new technologies, capabilities, software and codes out of enemy hands. Technology has frequently fallen into enemy hands.

In May of 1960, the U.S. lost a Top Secret U2 aircraft flown by Garry Powers. The aircraft was shot down over Russia, while flying at 70,000 feet, by an SA-2 missile. The Russians were quick to capture the aircraft pilot. The Russians obtained a confession by Gary Powers of U.S. spying. The Russians were also able to identify the equipment used in the spy mission.

In March of 2001, the Chinese crashed a fighter jet into an American EP-3 Aries II spy plane and caused enough damage that it killed the pilot and the aircraft was then forced to conduct an emergency landing in China. The Chinese refused to return the aircraft and stole the technology because it was not destroyed prior to landing the aircraft in that emergency situation.

Ten years later, in May of 2011 during the Osama Bin Laden raid, the U.S. lost another Top Secret Stealth Black aircraft. The aircraft crash landed and was abandoned at the raid site leaving invaluable top secret technology and intelligence in enemy hands.

During the Iraq and Afghanistan wars, the U.S. lost 80 aircraft, which adds up to an undermined amount of intelligence gathering information and Top Secret information, as reported in 2011.

In 2013, Russia claimed to have shot down a U.S. Drone over Crimea. In 2014, Syria also shot down a drone. Again, untold amounts of intelligence gathered and technology was lost to the enemy. Furthermore, in both of the Iraq and Afghan wars we started to hear about improvised explosive devices (IED). These were built from unexploded munitions the U.S. dropped. Because they did not explode, the enemy could take the explosives and reconfigure them for use against U.S. military ground forces.

In 2015 Syria shot down a predator drone and again lost untold Top Secret information and technology.

Thus, there is a need for systems and methods to protect sensitive data and information, such as sensitive government/military data, that are stored in components in an operational environment.

SUMMARY OF THE INVENTION

An object of the invention is to solve at least the above problems and/or disadvantages and to provide at least the advantages described hereinafter.

Therefore, an object of the present invention is to provide a system and method for the rapid destruction of one or more components.

Another object of the present invention is to provide a system and method for the rapid destruction of one or more electronic components.

Another object of the present invention is to provide a system and method for the rapid destruction of one or more components while the components are in an operational environment.

Another object of the present invention is to provide a system and method for the rapid destruction of one or more electronic components while the electronic components are in an operational environment.

Another object of the present invention is to provide a system and method for the rapid destruction of one or more components when a housing that houses the components is tampered with.

Another object of the present invention is to provide a system and method for the rapid destruction of one or more components via an explosive charge.

Another object of the present invention is to provide a system and method for the rapid destruction of one or more electronic components via an explosive charge.

Another object of the present invention is to provide a system and method for the rapid and autonomous destruction of one or more components via an explosive charge that is triggered by one or more predetermined events.

Another object of the present invention is to provide a system and method for the rapid and autonomous destruction of one or more electronic components via an explosive charge that is triggered by one or more predetermined events.

Another object of the present invention is to provide a system and method for the rapid destruction of components via an explosive charge that alerts personnel in proximity to the component prior to destroying the component.

Another object of the present invention is to provide a system and method for the rapid destruction of electronic components via an explosive charge that alerts personnel in proximity to the component prior to destroying the component.

Another object of the present invention is to provide a system and method for the rapid destruction of one or more components via mechanical means.

Another object of the present invention is to provide a system and method for the rapid destruction of one or more electronic components via mechanical means.

Another object of the present invention is to provide a system and method for the rapid destruction of one or more components via a chemical reaction.

Another object of the present invention is to provide a system and method for the rapid destruction of one or more electronic components via a chemical reaction.

Another object of the present invention is to provide a system and method for the rapid destruction of one or more components via a chemical reaction that produces heat.

Another object of the present invention is to provide a system and method for the rapid destruction of one or more electronic components via a chemical reaction that produces heat.

Another object of the present invention is to provide a system and method for the rapid destruction of one or more components via heating.

Another object of the present invention is to provide a system and method for the rapid destruction of one or more electronic components via heating.

Another object of the present invention is to provide a system and method for the rapid destruction of one or more components via a laser beam with an intensity sufficient to destroy the components.

Another object of the present invention is to provide a system and method for the rapid destruction of one or more electronic components via a laser beam with an intensity sufficient to destroy the components.

Another object of the present invention is to provide a system and method for the rapid destruction of one or more components via a magnetic field.

Another object of the present invention is to provide a system and method for the rapid destruction of one or more electronic components via a magnetic field.

Another object of the present invention is to provide a system and method for the autonomous destruction of information that is triggered by one or more predetermined events.

Another object of the present invention is to provide a system and method for the autonomous erasure of data stored on one or more components that is triggered by one or more predetermined events.

Another object of the present invention is to provide a system and method for the autonomous erasure of data stored on one or more electronic components that is triggered by one or more predetermined events.

Another object of the present invention is to provide a system and method for the rapid destruction of one or more components while preserving a decoy component.

Another object of the present invention is to provide a system and method for the rapid destruction of one or more electronic components while preserving a decoy component.

Another object of the present invention is to provide a system and method for the rapid destruction of one or more components while preserving a decoy component that stores data that is adapted to deceive or mislead an unauthorized user.

Another object of the present invention is to provide a system and method for the rapid destruction of one or more electronic components while preserving a decoy component that stores data that is adapted to deceive or mislead an unauthorized user.

To achieve at least the above objects, in whole or in part, there is provided an apparatus that is secure from unauthorized use, comprising a component, an explosive positioned such that, when the explosive is ignited, an explosive charge from the explosive will destroy the component and a processor adapted to generate a signal for igniting the explosive when at least one predetermined event occurs.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The present invention allows for the rapid destruction of components while these components are in an operational environment. The system directs its destructive force to the components(s) that need to be destroyed, thereby minimizing collateral damage. The system can, for example, be incorporated into computers and quickly destroy disk drives, computer chips, thumb drives and memory boards, etc. The present invention is particularly suited for the safeguarding of electronically stored information and/or classified technology in systems deployed in an operational environment.

The present invention protects electronically stored information from unauthorized access and/or apparatuses incorporating components from unauthorized use. One possible scenario in which the present invention can be used is soldiers on a battlefield who have to retreat quickly and leave behind computers that contain sensitive information. To avoid having sensitive data falling into the hands of the enemy, the soldiers can either remotely destroy the left-behind equipment or the equipment can self-destroy, as will be described in more detail below. Another possible scenario in which the present invention be used is a drone that is captured by enemies through GPS spoofing and automatically self-destroys important components upon landing at an airport that is not one of the pre-programmed home-bases.

The present invention can be incorporated into drones, full size aircraft, any type of vehicle, mines, missiles, torpedoes, bombs, phones, cameras, robots, satellites or other spacecraft, computers, hard drives, thumb drives, switches, routers, bugs, brief cases, safes, and generally any device that utilizes components on which sensitive data is stored or that utilizes technology that should only be accessed by authorized personnel.

Figure 1:
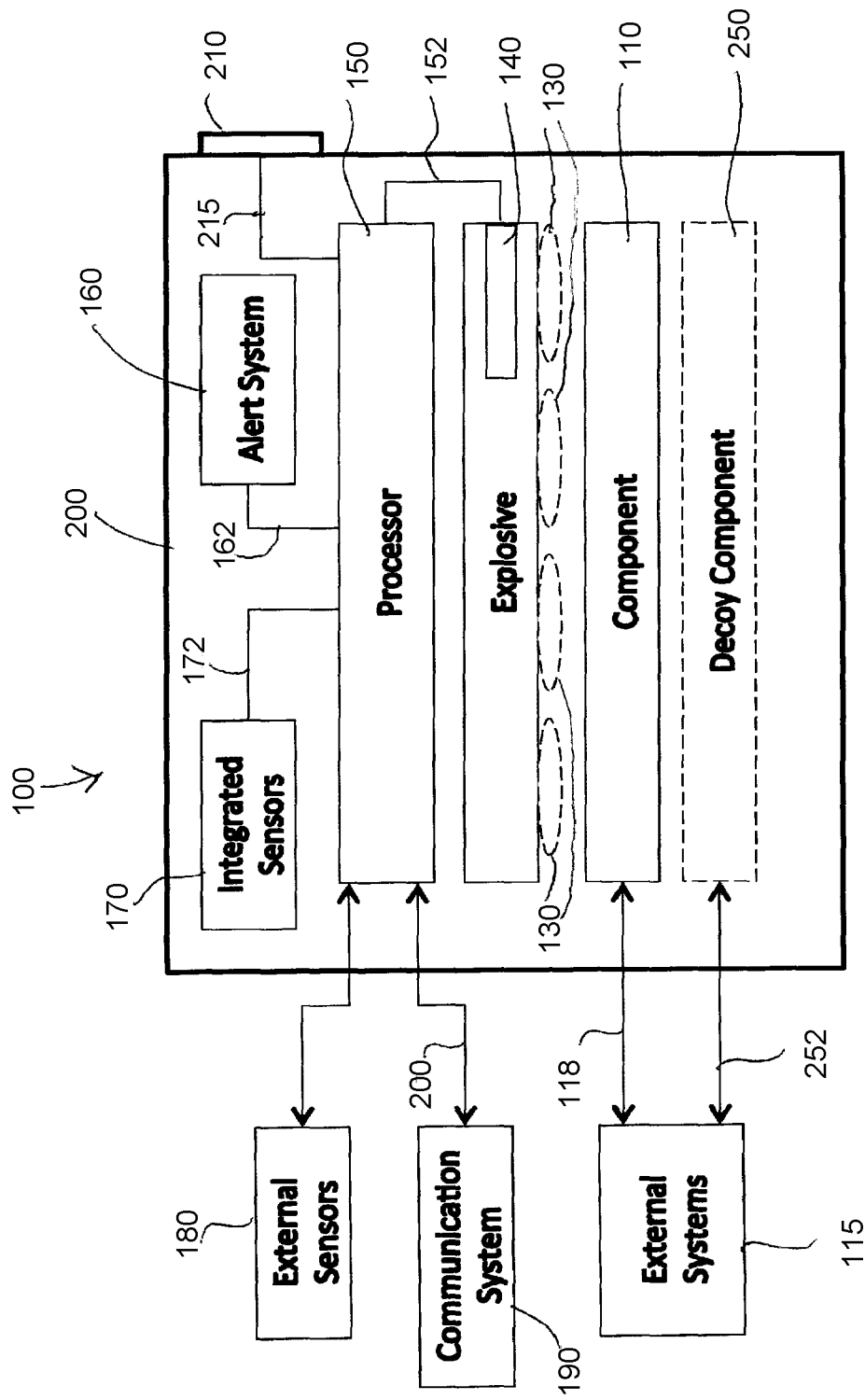
FIG. 1 is a schematic diagram of a secure apparatus 100, in accordance with one preferred embodiment of the present invention.

FIG. 1 is a schematic diagram of a secure apparatus 100, in accordance with one preferred embodiment of the present invention. The secure apparatus 100 includes a component 110, which could be an electronic component. The component 110 is generally any component that one wants to protect from unauthorized access and/or use. For example, the component 110 can be a data storage device (e.g., a solid state drive, hard disk drive, etc.) that stores sensitive data that one wants to protect from unauthorized access. Component 110 can also be processors that run sensitive software (e.g., encryption algorithms) that should not get into unauthorized hands, memory chips like RAMs or ROMs containing sensitive data or algorithms, any integrated circuit or embedded single-board computers that contain either sensitive information or represent an architecture and/or design that is highly sensitive/classified. Component 110 can also be a component that incorporates technology that one wants to protect from unauthorized use (e.g., classified military technology). Some additional examples of components 110 include, but are not limited to:

Dynamic RAM (DRAM);
Static RAM (SRAM);
Non-volatile RAM (VRAM);
Ferroelectric RAM (FRAM);
Non-volatile static RAM (NVSRA);

Erasable programmable ROM (EPROM);
Electrically erasable programmable ROM (EEPROM);
Flash memory;
Mask ROM;
sensors;
microphones;
thumb drives;
camera components;
film; and
microfiche.

The component 110 is connected to any external systems 115 that utilize the component 110 via one or more connections 118.

An explosive 120 is positioned adjacent to the component 110. The type of explosive 120 and its proximity to the component 110 are chosen such that the explosive, when triggered, delivers enough energy to the component 110 to destroy the component 110 and/or make the data stored in the component 110 inaccessible. As used herein, the phrase "destroy the component" means to render the component 110 unusable and/or to erase any data stored on the component 110 and/or make the data stored on the component inaccessible to an unauthorized user.

The explosive 120 is suitably implemented with PRIMASHEET® 2000 flexible explosive, which is manufactured by Ensign-Bickford Aerospace & Defense Company (www.EBA-D.com). The PRIMASHEET® 2000 flexible explosive comes in various thicknesses. The thickness of the PRIMASHEET® 2000 flexible explosive should preferably be chosen such that the explosive, when triggered, delivers enough energy to the component 110 to destroy the component 110. A thickness of between 2 mm and 3 mm should he suitable, however, other thicknesses can be used as long as the explosive, when triggered, delivers enough energy to the component 110 to destroy the component 110.

One or more pieces of metal 130 may be optionally placed between the explosive 120 and the component 110 to aid in the destruction or incapacitation of the component 110. The size, number and composition of the metal pieces 130 arc preferably chosen so that the heat generated by the explosive 120, when triggered, is sufficient to melt the metal pieces onto the component 110. The metal pieces 130 are suitably copper pieces, with a preferred thickness of between 1 mm and 2 mm. The metal pieces 130 may suitably be attached to the explosive 120 or to a support structure (not shown) used to support the component 110 and explosive 120 with glue or chemical adhesives, Velcro®, harnesses, tie downs, magnets, screws, rivets, clamps, clips interlocking designs, or any combination of these. Although four disc-shaped metal pieces 130 are shown in FIG. 1, any number of metal pieces and any shape may be used as long as the number, shape and thickness of the metal pieces 130 are such that an amount of metal sufficient to destroy or incapacitate the component 110 melts onto the component 110 when the explosive 120 is detonated.

An igniter 140 is positioned to ignite the explosive upon receipt of a signal from the processor 150 via connection 152. The type of igniter 140 used will depend on the type of explosive 120 used. The igniter 140 may be, for example, chemically-based (a chemical reaction ignites the explosive), mechanically-based (a predetermined amount of pressure or kinetic energy ignites the explosive 120), or thermal-based (a predetermined amount of heat ignites the explosive 120). One example of an igniter that can be used is described in U.S. Pat. No. 4,464,989 ("Integral Low-Energy Thermite Igniter").

The igniter 140 may be an "instant" igniter, in which the igniter will rapidly ignite (preferably in less than two seconds) the explosive 120 upon receipt of the proper signal from the processor 150. Alternatively, the igniter 140 may utilize a delayed igniter, which ignites the explosive 120 in a slower fashion than the instant igniter (preferably between 5 and 10 seconds after receiving the appropriate signal from the processor 150).

A processor 150 is used to control the destruction process and to provide optional alerts to operators via an optional alert system 160, which can receive signals from the processor 150 via connection 162. The processor 150 is preferably a special purpose computer, programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. However, the processor 150 may also be implemented with a small embedded computer system with integrated sensors, such as a smartphone running the iOS or Android operating system. The processor 150 may also be implemented with a modular electronic platform, such as the Raspberry Pi platform, or a proprietary embedded system with integrated sensors and actuators. The detonation triggering and process control functions are implemented via software running on the processor 150.

The processor 150 can receive data from one or more integrated sensors 170 (via connection 172) and/or one or more external sensors 180 via one or more connections 182. The processor 150 processes data from integrated sensors 170 and/or external sensors 180 to evaluate conditions for: (1) activation of alerts via the alert system 160; (2) activation of a destruction process to destroy or incapacitate component 110; and/or (3) deactivation of the destruction process. The integrated sensors 170 are sensors that are preferably positioned within a housing 200 that preferably houses the processor 150, alert system 160, explosive 120 and component 110. The external sensors 180 are sensors that are positioned outside of housing 200. It should be appreciated that the processor 150 and alert system could also be positioned outside the housing 200 while still falling within the scope of the present invention.

The processor 150 is preferably connected to a communication system 190 via connection 200. Communication system 190 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34bis analog modem connection, a cable modem, an ATM (Asynchronous Transfer Mode) connection, an FDDI (Fiber Distributed Data Interface) or CDDI (Copper Distributed Data Interface) connection. Communications system 190 may furthermore be, include or interface to any one or more of a WAP (Wireless Application Protocol) link, a GPRS (General Packet Radio Service) link, a GSM (Global System for Mobile Communication) link, CDMA (Code Division Multiple Access) or TDMA (Time Division Multiple Access) link, such as a cellular phone channel, a GPS (Global Positioning System) link, CDPD (Cellular Digital Packet Data), a RTM (Research in Motion, Limited) duplex paging type device, a Bluetooth radio link, or an IEEE 802.11-based radio frequency link (WiFi). Communications system 190 may yet further be, include or interface to any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection.

The destruction process can be initiated by the processor 150 in response to one or more predetermined triggering events, either alone or in combination. The destruction process can also be deactivated in response to one or more deactivation events. Possible triggering and/or deactivation events can include, but are not limited:

(1) an electronic signal: The presence or absence of an electronic signal. The electronic signal is preferably received via the communication system 190. Examples of electronic signals include, but are not limited to: (a) a telephone call; (b) a text message; (c) an email; (d) a password; and/or (e) a wireless signal;

(2) time: a predetermined amount of time has elapsed, or trigger at a specific set time. If time is used as a triggering and/or deactivation event, the integrated sensors 170 and/or external sensors 180 preferably include one or more timers and/or clocks;

(3) temperature: ambient and/or external temperature falls within a predetermined range. If temperature is used as a triggering and/or deactivation event, the integrated sensors 170 and/or the external sensors 180 preferably include a one or more temperature sensors;

(4) spatial location: GPS coordinates in 2 or 3 dimensional space is outside or within a predetermined range. If spatial location is used as a triggering and/or deactivation event, the integrated sensors 170 and/or the external sensors 180 preferably include a one or more GPS sensors and/or one or more magnetic sensors;

(5) spatial orientation: a predetermined tilt angle or tilt angle within a predetermined range. If spatial orientation is used as a triggering and/or deactivation event, the integrated sensors 170 and/or the external sensors 180 preferably include one or more magnetic sensors and/or other types of tilt sensors;

(6) motion: acceleration or deceleration that is outside or within a predetermined range, or a velocity that is outside or within a predetermined range. If motion is used as a triggering and/or deactivation event, the integrated sensors 170 and/or the external sensors 180 preferably include one or more accelerometers (for measuring acceleration) and one more velocity sensors (for measuring velocity);

(7) lighting: a predetermined amount of ambient light is detected. If lighting is used as a triggering and/or deactivation event, the integrated sensors 170 and/or the external sensors 180 preferably include one or more light sensors positioned to detect ambient light;

(8) acoustic signal: sound that is within or outside of a predetermined frequency range, pitch, duration, rhythm and/or amplitude. If an acoustic signal is used as a triggering and/or deactivation event, the integrated sensors 170 and/or the external sensors 180 preferably include one or more acoustic sensors;

(9) mechanical signal: one or more mechanical signals may be used as the triggering and/or deactivation event. Examples of mechanical signals include, but are not limited to, actuation of a trip wire, actuation of a push button, actuation of a flip switch, loosening and/or tightening of screws on the housing 200 (such as when the housing is tampered with); and

(10) magnetic or electromagnetic trigger: the presence or absence of a magnetic field having predetermined properties or a combination of magnetic fields having predetermined properties that together compose a magnetic key.

As discussed above, an optional alert system 160 can be used to alert potential operators of the imminent destruction of the component 110 once the ignition process has been initiated. This would allow the operators or other personnel to move away from the secure apparatus 100 before the destruction process starts. Example of the types of alert systems 160 that can be used include, but are not limited to:

(1) visual alerts: types of visual alerts can include, but are not limited to: (a) smoke via the use of primers that product smoke during ignition of the explosive 120; (b) optical indicators, such as LED lights or the like, positioned on the case so as to be visible by personnel; and (c) a display (e.g., an LCD display) mounted on the case 200 so as to be visible by personnel;

(2) audible alerts: types of audible alerts can include, but are not limited to: (a) air blowing out of an opening in the case 200 due to pressure build up during ignition of the explosive 120, which in turn creates a whistling type of sound; (b) a speaker that produces an audible alert when the ignition process starts; and (3) kinesthetic feedback: the secure apparatus 100 begins to rattle or vibrate when the ignition process starts.

If the igniter 140 utilizes a delayed igniter, the alert from the alert system 160 will give personnel in proximity to the secure apparatus 100 a limited amount of time (corresponding to the delay exhibited by the igniter) to deactivate the destruction process by creating one or more deactivation events, such as the activation/deactivation events listed above. Alternatively, the processor 150 can be programmed so that when the processor 150 detects the one or more predetermined events for initiating the destruction process, the processor 150 will send an alert via the alert system 160 for a predetermined amount of time prior to initiating the destruction process.

The secure apparatus 100 is not operational, with respect to the destruction process, until it is "armed." Arming of the secure apparatus is preferably accomplished via the processor 150, which is preferably programmed to "arm" the apparatus 100 upon receipt of a valid "arming code" and to "disarm" the apparatus 100 upon receipt of a valid "disarming code." When the apparatus is armed, the processor 150 will monitor for preprogrammed activating/deactivating events, such as the ones listed above, and will activate or deactivate the destruction process upon the occurrence of a predetermined one or more of the activating/deactivating events. When the apparatus 100 is disarmed, the processor will not activate the destruction process under any circumstances.

The arming and disarming codes are preferably received via communication system 190. However, the secure apparatus 100 may also include an input device 210 for sending arming and disarming codes to the processor 150 via connection 215. The input device 210 can be suitably implemented with a keypad, a touchscreen or any other input device known in the art. Further, the arming and disarming of the secure apparatus could be implemented by a pair of matching magnetic keys.

Referring back to FIG. 1, an optional "decoy" 250 may be used in the secure apparatus 100. The decoy 250 is preferably a special component that resembles the component 110 that is targeted for destruction or incapacitation. However, the decoy 250 is not loaded with any sensitive data and/or does not contain sensitive technology that one wants to keep away from unauthorized personnel. Erroneous and/or deceptive data may be stored in the decoy 250 and/or deceptive technology may be incorporated into the decoy 250 so as to mislead or deceive unauthorized personnel that access the secure apparatus 100. The decoy 250 is preferably connected (via one or more connections 252) to some or all of the external systems 115 that the component 110 is connected to so as to deceive unauthorized personnel into thinking that the decoy 250 is a legitimate component.

The decoy 250 is preferably positioned such that the component 110 is positioned between the explosive 120 and the decoy 250. The explosive 120 and/or the metal pieces 130 are chose such that the explosive charge from the explosive 120 is sufficient to destroy or incapacitate the component 110, but not powerful enough to destroy or incapacitate the decoy 250. In this way, the authentic component 110 is destroyed or incapacitated, and the unauthorized personnel may access the decoy 250 and be misled or deceived by any erroneous and/or deceptive data stored in the decoy 250 and/or by any deceptive technology incorporated into the decoy 250.

The housing 200 is preferably made of a material that is strong enough to either completely contain the explosive charge from the explosive 120, or to minimize any collateral damage that may be inflicted to property and/or personnel in proximity to the secure apparatus as a result of the explosive charge from the explosive 120. In this regard, the housing can be suitably made from steel reinforced Kevlar®. The housing 200 may be of any size and shape, depending the configuration of the secure apparatus 100 (e.g., the type and size of the component 110 being used, the number and size of other non-sensitive components mounted in the housing 200, the type of explosive 120 being used, the type of igniter 140 being used, etc.).

Connections 118/152/172/182/200/215 can be wired connections, wireless connections, wireless inductive connections, capacitive connections or any other mechanisms known in the art for connecting components.

The integrated sensor 170, alert system 160, processor 150, explosive 120, component 110 and decoy 250 (if used) may be suitably mounted on one or more circuit boards (not shown) using any standard techniques known in the art, and the one or more circuit boards (not shown) may be mounted inside the housing 200 using any techniques known in the art such as, for example, glue or chemical adhesives, Velcro®, harnesses, tie downs, magnets, screws, rivets, clamps, clips interlocking designs, or any combination of these.

Figure 2:
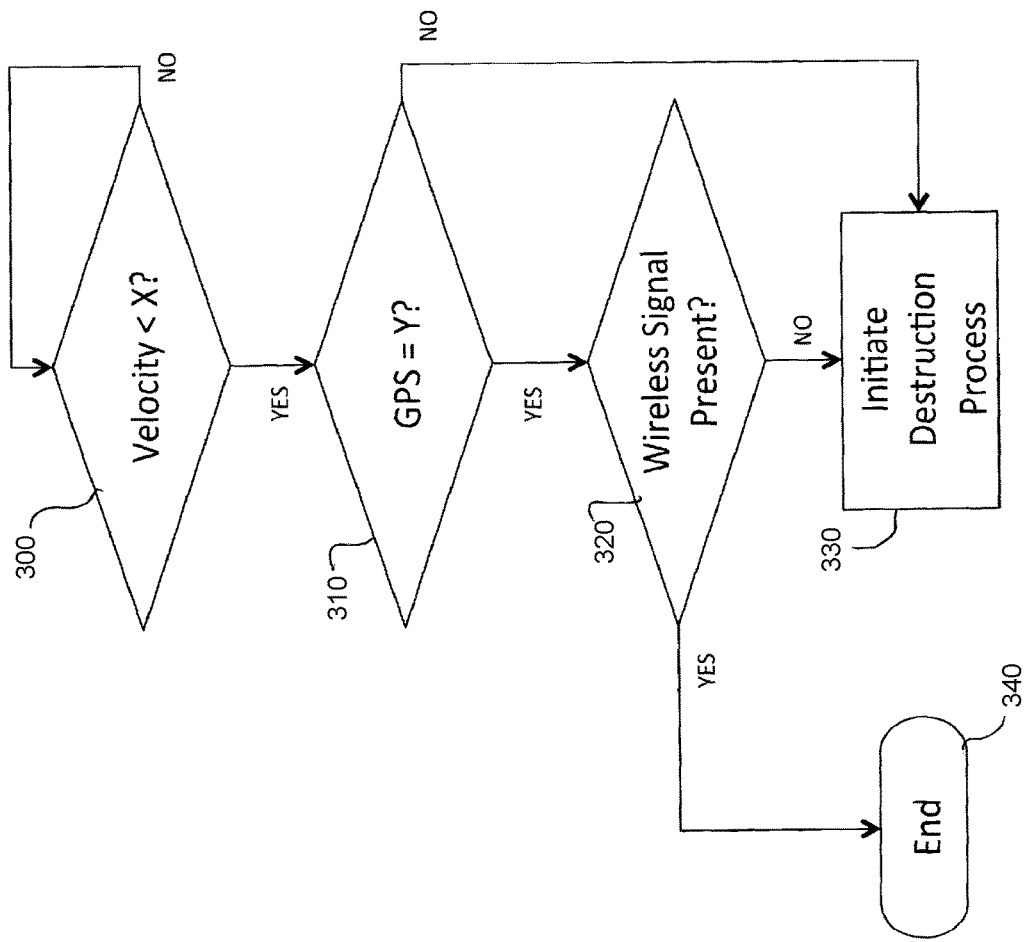
FIG. 2 is a flowchart of process steps carried out by a processor during an example component destruction scenario.

An illustrative example scenario for triggering of the destruction process by the processor 150 is a drone flying over enemy territory. The drone is captured by the enemy through GPS spoofing. GPS spoofing "tricks" the drone into navigating to and landing at an enemy base, which the drone believes is its home base. In this example, the processor 150 is programmed to handle such a scenario. Specifically, the processor 150 is programmed to initiate the destruction process based on the decision logic shown in FIG. 2, which is a flowchart of process steps carried out by the processor 150 in this example scenario.

The process starts at step 300, where the processor 150 determines if the velocity of the secure apparatus 100 is below a predetermined value "X." If so, the process proceeds to step 310. Otherwise the process loops back to step 300.

At step 310, the processor 150 determines if the GPS coordinates of the secure apparatus 100 corresponds to a predetermined location such as, for example, the home base of the drone. If so, the process continues to step 320. Otherwise, the process jumps to step 330, where the processor 150 initiates the destruction process which, in the embodiment of FIG. 1, means detonating the explosive 120 via igniter 140.

At step 320, the processor 150 determines if a wireless signal with predetermined characteristics has been received, which would be transmitted by the drone's home base. This wireless signal acts as an authentication mechanism, in that the wireless signal has to match one or more predetermined characteristics. The types of signal characteristics that can be used for authentication include, but are not limited to: (a) frequency; (b) amplitude; (c) frequency modulation pattern; and/or (d) amplitude modulation pattern.

If the processor 150 determines that a wireless signal with the predetermined signal characteristics has been detected, the process ends at step 340. Otherwise, the process proceeds to step 330, where the processor 150 initiates the destruction process which, in the embodiment of FIG. 1, means detonating the explosive 120 via igniter 140.

Thus, in the example scenario described above, the processor 150 would initiate the destruction process as soon as the drone velocity dropped below a predetermined value (during the landing sequence or shortly after take off) because, even though the drone is spoofed into thinking that it is at its home base (GPS coordinates are spoofed), the authenticating wireless signal would not be present.

Although an explosive 120 is illustrated and described as the component for destroying or incapacitating the component 110, it should be appreciated that other mechanisms for destroying or incapacitating the component 110 may be used without departing from the spirit and scope of the present invention. For example, if the component 110 is sensitive to magnetic fields (e.g., the component 110 is a hard disk drive), then a magnetic field generating component may be used in place of the explosive 120. For example, an electromagnet may be used in place of the explosive 120, which the processor 150 would activate to erase the data on the component 110.

As another example, a chemical reaction component may be substituted for the explosive 120 in which a chemical reaction is initiated with one or more chemicals that produces sufficient heat to destroy the component 110 or erase any data stored on the component 110.

As another example, a mechanical component may be substituted for the explosive 120 in which a mechanism is used to physically destroy the component via, for example, scratching the surface of a hard disk, crushing or breaking the component 110, or any other means to mechanically destroy the component 110.

As another example, the processor 150 may be programmed to permanently erase any data stored on the component 110. This option would eliminate the need for a separate component to erase data stored on the component 110.

As another example, a heating component may be substituted for the explosive 120 in which a heat is used to destroy the component or erase data stored on the component 110. The heating component could be implemented, for example, with a solid state laser that generates a laser beam intense to destroy the component 110 via heating.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the invention, as defined in the following claims.

What is claimed is:

1. An apparatus that is secure from unauthorized use, comprising:
 a component positioned within a housing;
 an explosive positioned within the housing such that, when the explosive is ignited, an explosive charge from the explosive will destroy the component; and wherein the housing comprises a housing material strong enough to contain the explosive charge; and
 a processor positioned within the housing and adapted to generate a signal for igniting the explosive when at least one predetermined event occurs.

2. The apparatus of claim 1, wherein the component comprises an electronic component.

3. The apparatus of claim 2, wherein the electronic component stores data.

4. The apparatus of claim 1, wherein the component comprises a data storage device.

5. The apparatus of claim 1, wherein the explosive comprises a flexible explosive.

6. The apparatus of claim 1, wherein further comprising at least one sensor for detecting the at least one predetermined event.

7. The apparatus of claim 6, wherein the at least one predetermined event comprises at least one of:
 (1) detection of an electronic signal;
 (2) a predetermined amount of time elapses;
 (3) an ambient temperature falls within a predetermined range;
 (4) the apparatus is located at a predetermined location;
 (5) a tilt angle of the apparatus falls within a predetermined range;
 (6) a measured acceleration or deceleration of the apparatus falls within a predetermined range;
 (7) the apparatus is moving at a velocity that falls within a predetermined range;
 (8) a predetermined amount of ambient light is detected;
 (9) a characteristic of a detected acoustic signal falls within a predetermined range;
 (10) a detection of a mechanical signal; and
 (11) a detection of a predetermined magnetic field or predetermined combination of magnetic fields.

8. The apparatus of claim 7, wherein the alert system is in communication with the processor, and wherein the processor is adapted to generate an alert via the alert system, when the at least one predetermined event occurs, for a predetermined period of time prior to generating the signal for igniting the explosive device.

9. The apparatus of claim 1, wherein at least the component and explosive are positioned inside a housing.

10. The apparatus of claim 9, further comprising a decoy component positioned in the housing so as to not be destroyed when the explosive is ignited.

11. The apparatus of claim 9, wherein the housing is adapted to contain the explosive charge.

12. The apparatus of claim 1, further comprising an igniter in electrical communication with a processor and positioned to ignite the explosive in response to the signal generated by the processor.

13. The apparatus of claim 1, further comprising a communication system that receives communication signals and sends the communication signals to a processor.

14. The apparatus of claim 13, wherein the communication system is a wireless communication system.

15. The apparatus of claim 1, further comprising an input device attached to an outside surface of the housing in communication with the processor for enabling a user to send an arming code or a disarming code to the processor.

16. The apparatus of claim 1, further comprising a metallic material positioned between the explosive and the component, wherein a composition, size and position of the metallic material is such that the explosive charge will melt the metallic material onto the component.

17. The apparatus of claim 16, wherein the metallic material comprises copper.

18. The apparatus of claim 1, further comprising an alert system that generates an alert when the at least one predetermined event occurs.

* * * * *